Aug. 20, 1940. H. D. MacDONALD ET AL 2,211,902
WHEEL
Filed Jan. 6, 1939
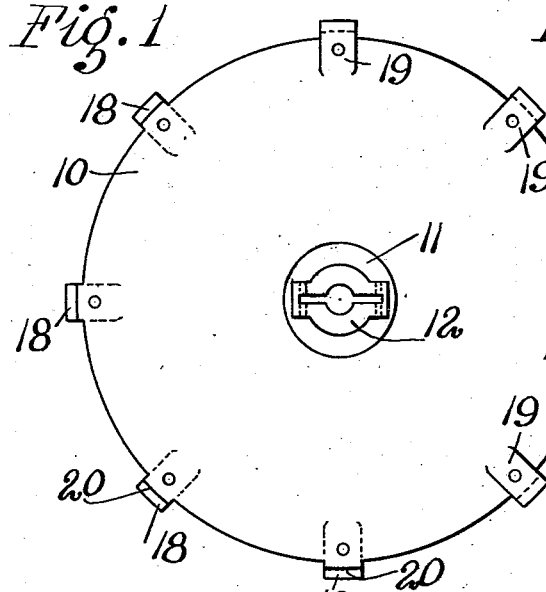
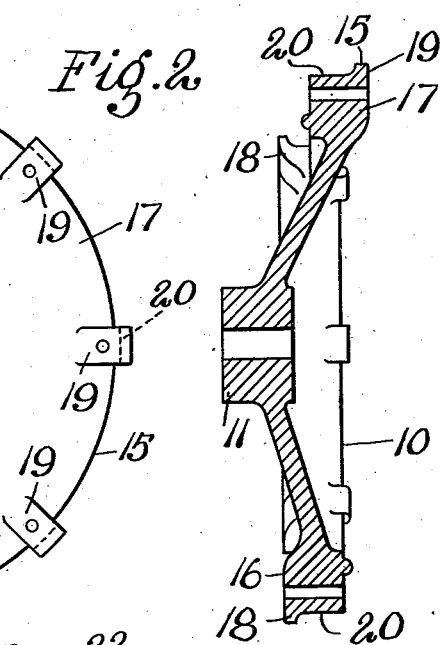
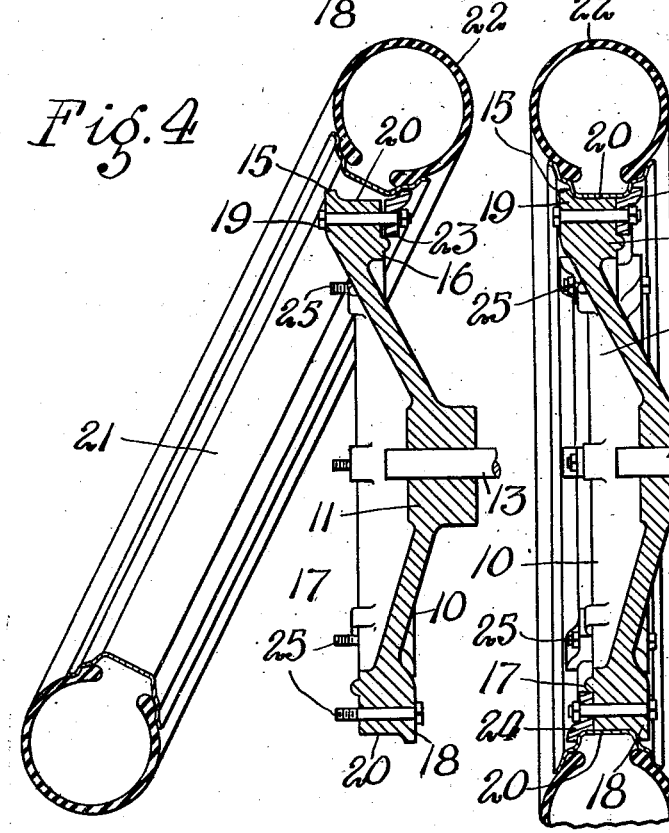
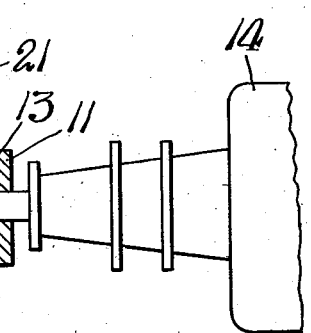
Inventor
H.D. MacDonald
W.S. Brink Patented Aug. 20, 1940

2,211,902

UNITED STATES PATENT OFFICE 2,211,902

WHEEL

Howard D. MacDonald, La Grange, Ill., and Winfield S. Brink, Akron, Ohio; said MacDonald assignor to International Harvester Company, a corporation of New Jersey Application January 6, 1939, Serial No. 249,628

3 Claims. (Cl. 301—24)

This invention relates to a wheel for carrying a demountable rim. More particularly, the invention relates to a wheel for use on a tractor or a similar vehicle in which it is desirable to vary the tread.

Variable tread wheels have become widely adopted for use in agricultural tractors and especially those of the row crop type. Various forms of wheels have been devised, each including features adapting the wheel for such use. The fundamental theory behind most wheel constructions is the provision of a wheel in which the plane of the hub is axially offset with the plane of the wheel periphery or that portion providing the seat for the demountable rim. This type of wheel is adapted to be mounted on the vehicle in either of two positions; viz., with the hub portion disposed inwardly toward the vehicle body or with the hub portion disposed outwardly away from the vehicle body, thus providing a wider or narrower tread, respectively. Most of the wheels are provided with axial adjustment along the vehicle axle, thus increasing the number of tread positions obtainable. Other wheels have specially provided therefor removable lugs for engaging opposite sides of the tire-carrying rim which is mounted on the wheel. The provision of such lugs materially increases the number of parts to be handled when it becomes necessary to remove the tire from the wheel. Still other constructions have provided rim-engaging positions as integral parts of the wheel, thus eliminating approximately one-half the number of parts to be handled. Wheels of this type, however, are open to the objection that the tire-carrying rim is removable from only one side, i. e., the side on which the removable lugs are carried, and accordingly, when the wheel is mounted on the tractor with the integral lug portions facing outwardly, the entire wheel must be removed from the vehicle before the tire and rim can be removed from the wheel. These various disadvantages result in considerable expenditure of time and labor and militate somewhat against the adaptation of pneumatic tired wheels to vehicles requiring variable treads.

The principal object of the present invention is to provide a wheel construction in which a demountable rim is readily removed therefrom from either side, regardless of the position of the wheel on the vehicle.

An important object is to provide a wheel having improved rim-supporting means in the form of fixed or rigidly carried lugs and detachable lugs cooperating to permit achievement of the above object.

Still another object is to provide a wheel generally conventional in construction and having the improved rim-supporting means included thereon without materially increasing the cost of the wheel.

Briefly and specifically, these and other desirable objects are achieved by the provision of a wheel having a plurality of rim-supporting lugs disposed about its periphery in circumferentially spaced relation, certain of the lugs being integrally formed or otherwise normally fixed at one face of the wheel within one-half of the wheel periphery and other lugs similarly disposed at the other face of the wheel within the other half of the wheel periphery. Removable or detachable lugs are adapted to be secured to the wheel at respective opposite surfaces for co-operation with the integrally formed lugs in mounting a tire-carrying rim on the wheel. The rim may be readily removed from either side of the wheel by removing the removable lugs from their positions at one side of the wheel within one-half of the wheel periphery. The remaining lugs may be slightly loosened, depending upon the rim construction, and that portion of the rim released by the removal of the first named lugs may be moved outwardly away from the wheel, the remaining portion of the rim being readily freed from the remaining lugs.

A more complete understanding of the objects and desirable features of the invention may be had from the following detailed description taken in connection with the accompanying sheet of drawings, in which:

Figure 1 is a side elevational view of the improved wheel;

Figure 2 is a vertical sectional view through the same;

Figure 3 is a sectional view of the wheel shown with a tire and rim in position thereon and with the wheel carried on the axle of a vehicle; and, Figure 4 is a similar view showing the manner of removing the tire and rim from the wheel.

The particular wheel chosen for the purposes of illustration is generally indicated at 10 as being of the disk type. The wheel has a central hub portion 11 provided with an adjustable clamp 12 for mounting the wheel on an axle 13 of a tractor or other vehicle, generally indicated at 14 in Figure 3. The wheel 10 is provided with a peripheral portion 15 disposed in a plane axially offset from the plane of the hub 11. The peripheral portion 15 has opposite faces 16 and 17 and is provided with rim-supporting means in the form of a plurality of circumferentially spaced, rim-supporting portions or seats projecting radially therefrom, certain of the portions or seats extending axially and radially at the face 16, as at 18, and others extending axially and radially at the opposite face 17, as at 19. In the preferred wheel construction illustrated there are eight seats or lug portions disposed about the periphery of the wheel. The four lug portions 18 at the face 16 of the wheel are consecutively disposed within one-half of the wheel periphery or generally at one side of an imaginary diameter drawn through the wheel. The lug portions 19 at the opposite face 17 of the wheel are consecutively disposed within the other half of the wheel periphery or generally at the opposite side of the aforesaid diameter. The total arc of the wheel periphery delineated by either set of lug portions 18 or 19 is less than 180 degrees.

Each of the lug portions 18 or 19 is formed with a rim-receiving seat 20, which is preferably disposed radially outwardly of the peripheral portion 15 for purposes hereinafter to appear. The seats 20 are adapted to receive a tire-carrying rim 21, which in turn carries a pneumatic tire 22. The rim is mounted on the wheel, as shown in Figure 3, and a plurality of removable or detachable lugs 23 and 24 are secured to the opposite faces 16 and 17, respectively, of the wheel. The lugs 23 and 24 are separately secured to the wheel by bolts 25, the lugs 23 cooperating with the integral lug portions 19, and the lugs 24 with the lug portions 18, to engage opposite side portions of the rim center-well for mounting the rim on the wheel.

Figure 3 shows the wheel mounted on the axle of a vehicle with the hub portion 11 facing or extending inwardly toward the vehicle body. The clamp portion 12 on the wheel permits the wheel to be axially adjusted along the axle 13, and, to obtain other positions, the wheel may be removed from the axle 13 and reversed thereon; that is, with the hub 11 facing outwardly away from the vehicle body, the tire 22 being thereby disposed closely adjacent the tractor or vehicle body 14.

In removing the tire from the wheel, as shown in Figure 4, it is necessary only to remove four lugs from the wheel, the lugs to be removed depending upon the position of the wheel on the axle 13. As shown in Figure 4, the face 17 of the wheel is facing outwardly from the vehicle and it, therefore, becomes necessary to remove only four removable lugs 24. The bolts 25 securing the lugs 23 may or may not be loosened, depending upon the ease with which the rim may be removed therefrom. The lower portion of the tire and rim, as shown in Figure 4, thus released from the lugs 24, is swung outwardly from the wheel and the upper portion of the rim is easily freed from the clamping action of the lugs 23 and the lug portions 19. The location of the rim-receiving seats 20 at positions radially outwardly of the outer periphery of the peripheral portion 15 enables the rim 21 to be easily and readily slipped over the wheel, there being no interference between the peripheral portion 15 and the inner periphery of the rim 21. The tire and rim may be mounted on the wheel by reversing the aforesaid procedure. When the wheel is mounted on the axle 13 with the hub portion 11 thereof facing outwardly, the procedure of removing the tire and rim from the wheel is somewhat similar to that outlined above. In this instance, however, only the four lugs 23, being now at the outside of the wheel, are removed, and the tire is swung outwardly from the wheel as before. The disadvantage heretofore encountered in removing the tire and rim from the wheel has been eliminated and it is not necessary to remove the wheel from the axle when removing the tire; nor is it necessary to detach all of the lugs at one face of the wheel.

From the foregoing description of a preferred construction, it will be seen that a new and improved wheel has been provided incorporating means for mounting a tire-carrying rim on the wheel and that disadvantages heretofore encountered have been eliminated. Further advantages and objects other than those hereinbefore set forth will be apparent to those skilled in the art, and it will be further appreciated that numerous modifications and alterations may be made in the construction of the wheel and in the adaptation thereof to other rims without departing from the spirit and scope of the appended claims.

What is claimed is:

1. A wheel for carrying a demountable rim, said wheel having opposite faces, a set of rim-supporting portions disposed in spaced relation about substantially less than one-half of the wheel periphery and projecting axially and radially in one direction at only one face of the wheel, and a second set of similar portions disposed about substantially less than the other half of the wheel and projecting axially and radially in the other direction at only the other face of the wheel, the portions in one set being respectively diametrically opposite the portions in the other set.

2. A tire and wheel assembly for demountably carrying a tire and rim on a wheel, comprising a wheel having opposite faces, peripheral rim-engaging members carried by the wheel in circumferentially spaced relation, said members being normally fixed on the wheel at one face thereof and within one-half of the wheel periphery, and a peripheral rim-engaging member normally fixed on the wheel at the other face thereof and within the other half of the wheel periphery, a tire-carrying rim mounted on the wheel and having a center well, the aforesaid pair of rim-engaging members engaging the center well at one side thereof and the other member engaging the other side thereof, and a plurality of removable rim-engaging lugs carried by the wheel respectively opposite the aforesaid members and respectively engaging opposite sides of the rim center well for securing the rim to the wheel.

3. A tire and wheel assembly for demountably carrying a tire and rim on a wheel, comprising a wheel having opposite faces, peripherally disposed rim-engaging means at one face of the wheel and lying within one-half of the wheel periphery, second peripherally disposed rim-engaging means at the other face of the wheel and lying within the other half of the wheel periphery, a tire-carrying rim mounted on the wheel and having opposite side portions respectively engaged by the aforesaid first and second means, and removable securing means associated and cooperating respectively with the aforesaid means and respectively engaging opposite side portions of the rim for securing the rim to the wheel.

HOWARD D. MACDONALD.
WINFIELD S. BRINK.